A. L. CAMPBELL.
SHAFT COUPLING FOR MOTOR CARS.
APPLICATION FILED AUG. 22, 1916.

1,251,635.

Patented Jan. 1, 1918.
2 SHEETS—SHEET 1.

A. L. CAMPBELL.
SHAFT COUPLING FOR MOTOR CARS.
APPLICATION FILED AUG. 22, 1916.
1,251,635.
Patented Jan. 1, 1918.
2 SHEETS—SHEET 2.
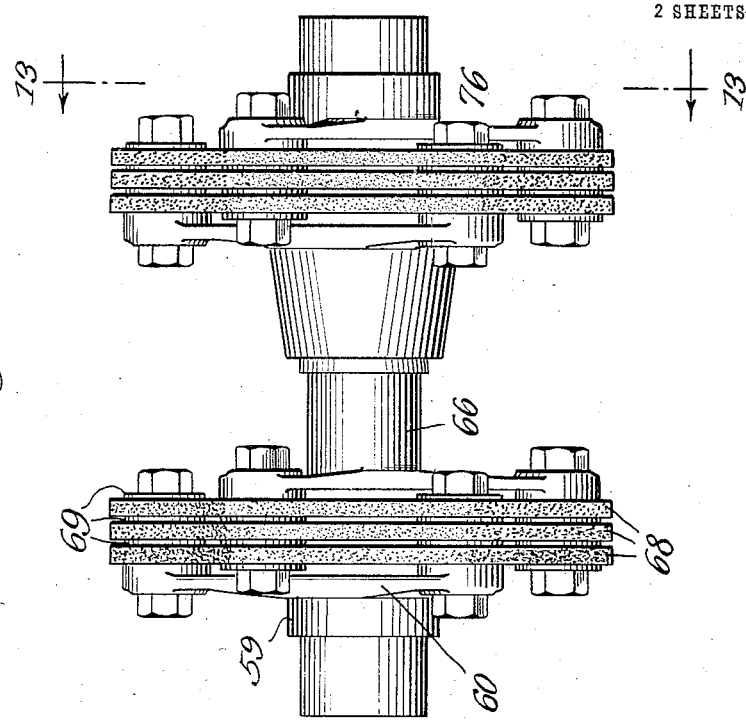
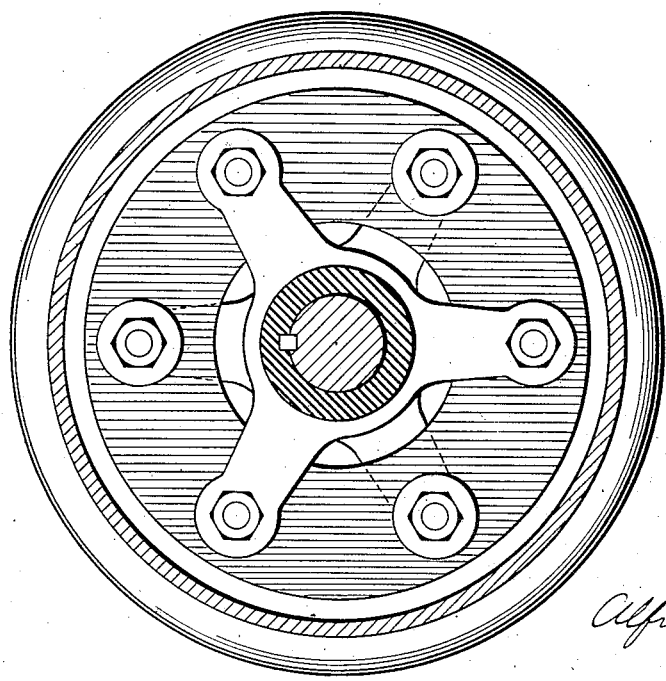
Alfred L Campbell
INVENTOR
BY Burger & Clarke
ATTORNEYS

UNITED STATES PATENT OFFICE.

ALFRED L. CAMPBELL, OF ELMHURST, NEW YORK, ASSIGNOR TO BREWSTER & CO., A CORPORATION OF NEW YORK.

SHAFT-COUPLING FOR MOTOR-CARS.

1,251,635.  Specification of Letters Patent.  Patented Jan. 1, 1918.

Application filed August 22, 1916. Serial No. 116,303.

*To all whom it may concern:*

Be it known that I, ALFRED L. CAMPBELL, a citizen of the United States, residing at Elmhurst, Long Island, county of Queens, and State of New York, have invented a new and useful Improvement in Shaft-Couplings for Motor-Cars, of which the following is a specification.

My invention consists of an improved flexible shaft coupling particularly adapted for the universally mounted driving shaft of motor cars.

In order that my invention may be fully understood, I shall first describe in detail the mode in which I, at present, prefer to carry into practice the various features of my invention and then point out the various features in the claim.

Reference is to be had to the accompanying drawings forming part of this specification, in which like parts are designated by the same numerals in all the figures.

Figure 1 is a longitudinal sectional view showing the flexible shaft coupling of a motor car embodying my invention.

Fig. 2 is a cross-sectional view on the line 2—2, Fig. 1.

Fig. 3 is a side view of part of the flexible coupling.

On the rear end portion of the motor crank shaft 44 (Fig. 1) is fixed, preferably by the construction shown, the female member 45 of, by preference, a cone clutch, which is engaged by the male clutch member 46.

The end of the driving shaft 44 projects through the clutch and on it is mounted both to turn and to slide lengthwise a sleeve 48, having on its forward end a collar 49, between which and a collar 50 fixed on the rear extremity of the shaft 44, is interposed a spring 51 coiled around the sleeve 48. The outer periphery of the sleeve collar 49 is here integrally attached to a cylindrical casing 52, having its rear end formed with a peripheral flange 53, which is preferably bolted, as shown, to the hub 54 of the male clutch member 46, so that the coiled spring 51 will tend to hold the male clutch member 46 in engagement with the female member 45, and thus with the driving shaft 44.

To the hub of the male clutch member 46 and flange 53 is also bolted the ring 55 and flange 56 formed integrally on a hollow driven shaft section 57, on which is keyed and secured by the nut 58, the hub 59 of a spider 60 forming part of an endwise and universally flexible coupling 61 connecting the movable male clutch section 57 with the section 77 of the driven shaft in the transmission, so that the driven male member 46 of the clutch can be engaged with and disengaged from the driving female member 45 of the clutch, by the clutch operating mechanism.

On the hub 59 of the flexible coupling is mounted to turn freely a ball-bearing collar 63 formed with a peripheral flange 64, which is engaged by the clutch actuating fork 65, operated by the clutch pedal (not shown), so as to throw the spring-engaged clutch out in the usual way.

The spider 60, rigidly attached to the male clutch member 46 as described, is flexibly connected to a tubular medial section 66 of the driven shaft by a similar spider 67, which is formed integrally on the said tubular shaft section 66, and whose arms are staggered with relation to the arms of the spider 60, a plurality of alternate thin leather and metal rings, 68 and 69 respectively, being interposed between the spiders 60 and 67, and received on tubular bosses 70 and 71 formed on said spiders 60 and 67 respectively, to which bosses they are secured by bolts 72 and 73 and nuts 74 and 75 respectively.

By a like spider and multiple leather and metal ring connection 76, to that just described, the medial driven shaft section 66 is flexibly and universally connected to a further driven shaft section 77, having its bearing 78 in the transmission box 79 and driving the transmission gearing as hereinafter described.

The respective outer driven shaft sections 57 and 77 are each maintained in central while endwise and universal flexible relation to each other and to the medial shaft section 66, by means of headed sleeves 80 and 81 fitted to turn and slide in the respective ends of the tubular medial shaft section 66, and having balls 82 and 83 respectively formed on their outer ends and fitted to turn universally in sockets 84 and 85 respectively formed on the adjacent ends of the respective shaft sections 57 and 77, a coiled spring 86 being contained within the medial tubular shaft section 66 between the sleeves 80 and 81 and pressing the balls 82 and 83 yieldingly in their respective sockets 84 and 85.

To the transmission box 79 and bearing 78 of the shaft section 77 is rigidly attached the spherical shell 37, hereinbefore referred to as constituting the bearing of the universal shaft coupling just described, and which is itself fitted to turn universally in the spherical bearing 36 fixed on the cross member 35 of the frame 28. The center of the universal shell bearing 37 is approximately at the middle point of the axis of the medial tubular shaft section, and the forward end of the torque tube is rigidly attached to the transmission box, so that as the rear axle and differential rise, fall and rock with the motion of the rear springs, with respect to the frame 28, the transmission box 79 and the rear end of the torque tube rise, fall and rock freely on the universal bearing 37, and the multiple leather and metal collar coupling described, permits the rear shaft sections, from the section 77 to the differential, to move freely and universally with respect to the forward clutch shaft section 57.

I claim as my invention:

The combination, with the clutch shaft section and the transmission shaft section, of a tubular medial shaft section, axially and universally flexible connections between said medial shaft section and the clutch and transmission shaft sections, centering plungers working in the ends of the tubular medial section, ball and socket connections between said plungers and the clutch and transmission shaft sections, and a spring interposed in said tubular medial section between the plungers.

ALFRED L. CAMPBELL.